(12) United States Patent
Tung

(10) Patent No.: US 8,457,011 B2
(45) Date of Patent: Jun. 4, 2013

(54) GATEWAY DEVICE AND METHOD FOR ESTABLISHING A VOICE OVER INTERNET PROTOCOL COMMUNICATION

(75) Inventor: Shih-Hao Tung, Tu-Cheng (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 223 days.

(21) Appl. No.: 12/978,628

(22) Filed: Dec. 27, 2010

(65) Prior Publication Data

US 2012/0044820 A1 Feb. 23, 2012

(30) Foreign Application Priority Data

Aug. 19, 2010 (CN) .......................... 2010 1 0257411

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)

(52) U.S. Cl.
USPC ........... 370/252; 370/352; 370/338; 370/216; 370/235; 370/329; 370/392; 370/468; 370/503; 370/238

(58) Field of Classification Search
None
See application file for complete search history.

(56) References Cited

U.S. PATENT DOCUMENTS

| | | | |
|---|---|---|---|
| 7,768,998 B1* | 8/2010 | Everson et al. | 370/352 |
| 8,194,556 B2* | 6/2012 | Tacconi et al. | 370/252 |
| 2002/0116497 A1* | 8/2002 | Tung | 709/227 |
| 2010/0284267 A1* | 11/2010 | Domingguez Romero et al. | 370/216 |
| 2012/0002646 A1* | 1/2012 | Zabawskyj et al. | 370/338 |

* cited by examiner

*Primary Examiner* — Ian N Moore
*Assistant Examiner* — Eric H Wang
(74) *Attorney, Agent, or Firm* — Altis Law Group, Inc.

(57) ABSTRACT

A gateway device and method for establishing Voice over Internet Protocol (VoIP) communication includes setting coding methods of the VoIP, and setting quality of service (QoS) parameters corresponding to each coding method. In response to dialing a VoIP phone call from a local user terminal, a Session Initiation Protocol (SIP) session is initiated to determine a coding method. QoS parameters corresponding to the determined coding method are parsed to generate a request packet. The request packet is sent to base station to request for establishing a VoIP phone call. The VoIP phone call is established between the local user terminal and a remote user terminal by sending the VoIP packets through the base station to the remote user terminal.

12 Claims, 3 Drawing Sheets

GATEWAY DEVICE AND METHOD FOR ESTABLISHING A VOICE OVER INTERNET PROTOCOL COMMUNICATION

BACKGROUND

1. Technical Field

Embodiments of the present disclosure relate to communication technology, and more particularly to a gateway device and method for establishing Voice over Internet Protocol (VoIP) communication using the gateway device.

2. Description of Related Art

People may communicate with each other by dialing a phone call over a network, such as the Internet. However, an unstable network may influence communication quality.

Furthermore, before dialing the phone call over the Internet, people have to login to a network platform provided by a telecommunication company and download a software program. The software program allows telephone calls to be made over the Internet using a general purpose computer. Thus, a gateway device and method for ensuring the communication quality of the phone call over the network are desired.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In general, the word "module," as used herein, refers to logic embodied in hardware or firmware, or to a collection of software instructions, written in a programming language, such as, Java, C, or Assembly, for example. One or more software instructions in the modules may be embedded in firmware, such as an erasable programmable read only memory (EPROM). It will be appreciated that modules may comprise connected logic units, such as gates and flip-flops, and may comprise programmable units, such as programmable gate arrays or processors. The modules described herein may be implemented as either software and/or hardware modules and may be stored in any type of computer-readable medium or other computer storage system.

Figure 1:
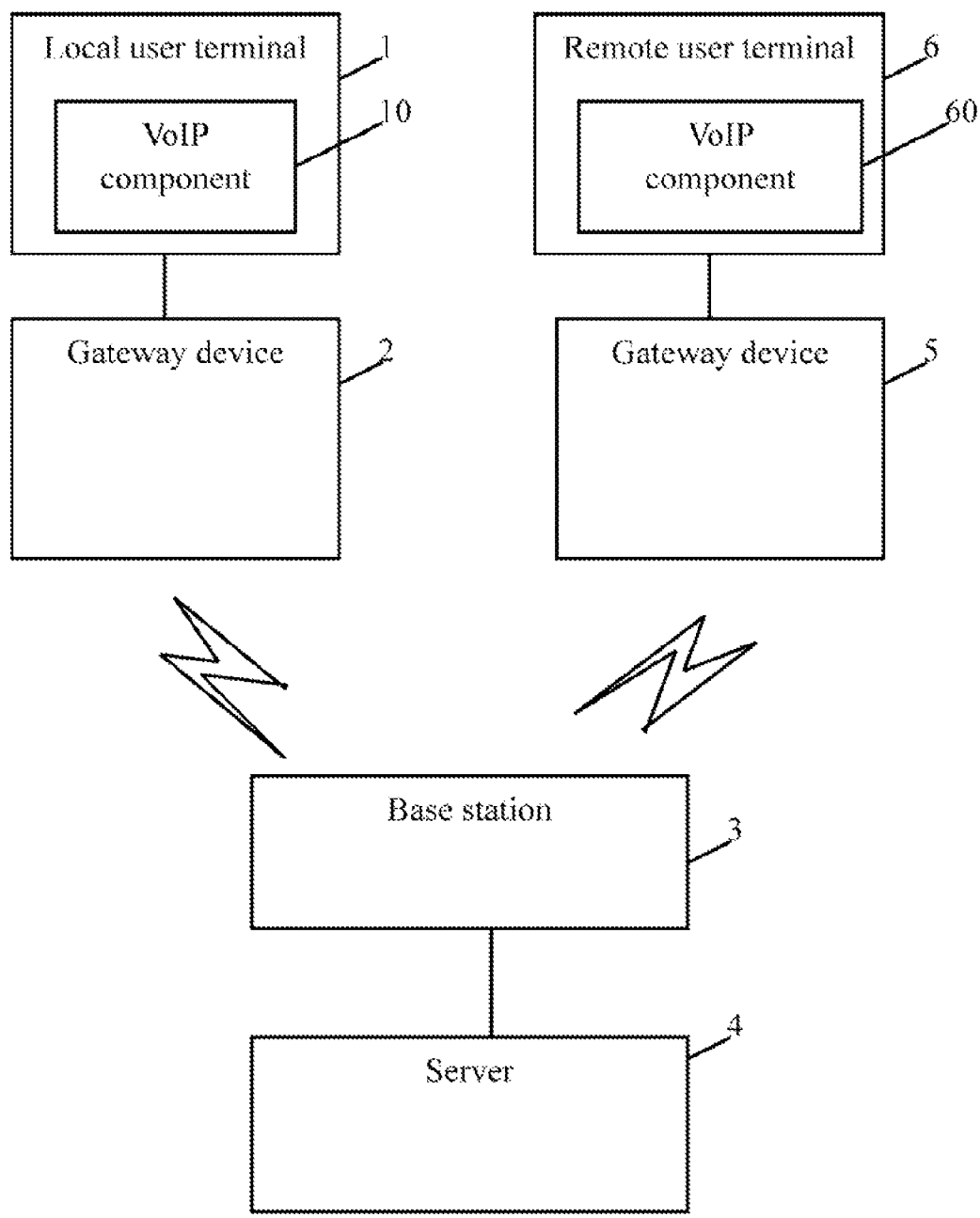
FIG. 1 is a block diagram of one embodiment of a gateway device in communication with a local user terminal and base station.

FIG. 1 is a block diagram of one embodiment of a gateway device 2 in communication with a local user terminal 1 and a base station (only one shown) 3. In some embodiments, the gateway device 2 may be used to help the local user terminal 1 to establish a communication with a remote user terminal 6 over a network via the base station 3. The communication may be a Voice over Internet Protocol (VoIP) communication, for example. The network may be the Worldwide Interoperability for Microwave Access (WIMAX), the second-generation (2G), or the third-generation (3G), or any other kind of communication network. Detailed descriptions of the gateway device 2 are provided below. In some embodiments, the base station 3 is in a wireless telephone system, which may be provided by a telecommunication company. More base stations are included in the wireless telephone system, for simplification, only one base station 3 is used to describe the disclosure.

In some embodiments, the local user terminal 1 may send a request packet to the base station 3 through the gateway 2, for requesting a communication with the remote user terminal 6. The base station 3 are connected to a server 4 of the wireless telephone system of the telecommunication company. The server 4 may process the request packet transmitted by the base station 3, and send a response packet to the gateway device 2 through the base station 3. The gateway 2 may transmit data packets including voice data of a user of the local user terminal 1 to the remote user terminal 6 through the base station 3 according to the response packet. Therefore, the communication between the local user terminal 1 and the remote user terminal 6 is established. In other embodiments, the remote user terminal 6 also may request to establish the communication with the local user terminal 1 according to above mentioned procedure.

The local user terminal 1 and the remote user terminal 6 may be a computer, a mobile phone, a personal digital assistant, or any other kind of electronic device. As shown in FIG. 1, the local user terminal 1 has a VoIP component 10, and the remote user terminal 6 has a VoIP component 60. In some embodiments, the VoIP components 10 and 60 may be a program to generate VoIP packets according to users' voice data. The local user terminal 1 and the remote user terminal 6 may complete the communication by transmitting the VoIP packets to each other. Detailed descriptions are provided below.

Figure 2:
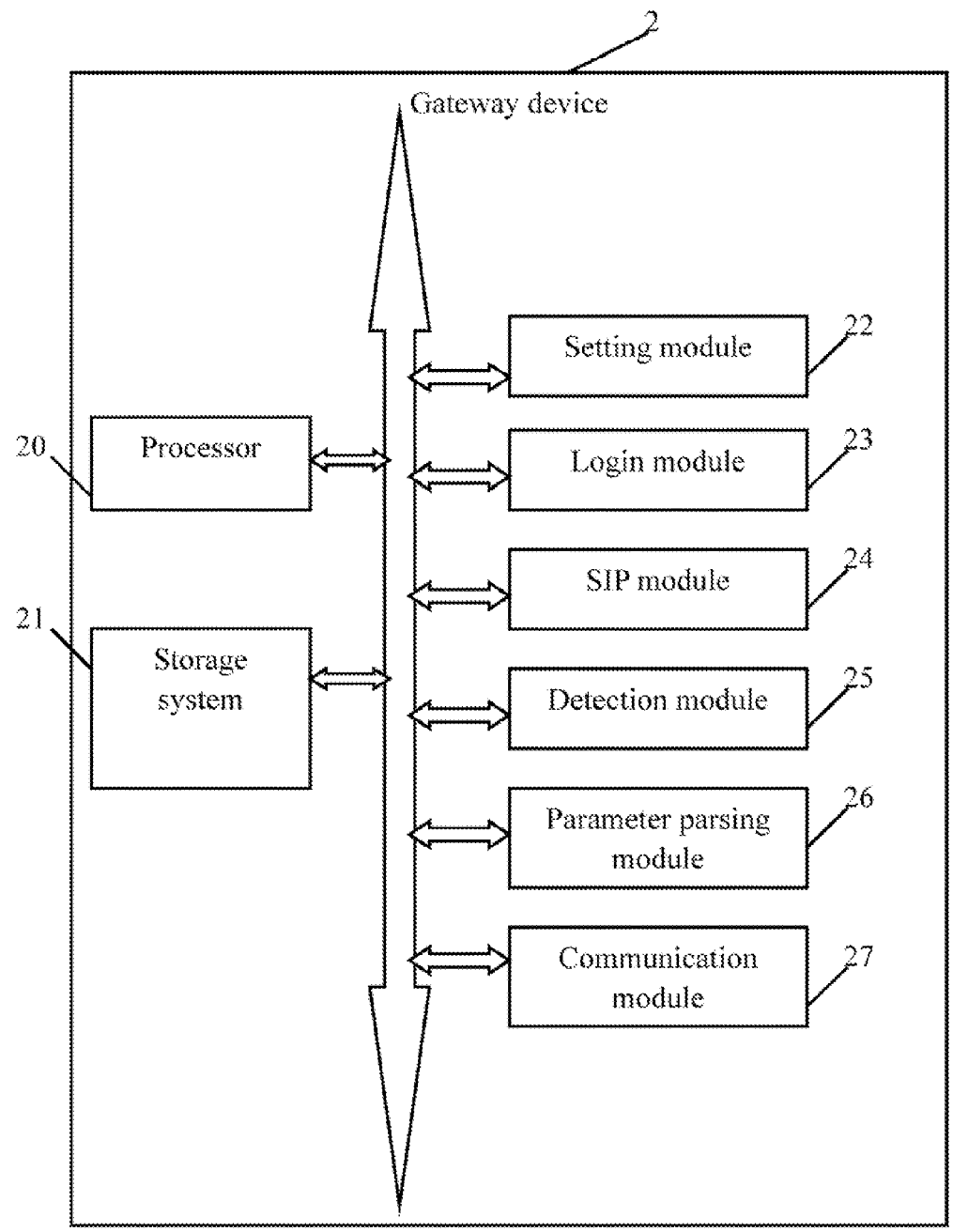
FIG. 2 is a schematic diagram of one embodiment of the gateway device of FIG. 1.

FIG. 2 is a block diagram of one embodiment of the gateway device 2. The gateway device 2 includes at least one processor 20 and a storage system 21. The at least one processor 20 executes one or more computerized operations of the gateway device 2 and other applications, to provide functions of the gateway device 2. The storage system 21 stores one or more programs, such as programs of the operating system, other applications of the gateway device 2, and various kinds of data, such as a contact list, messages, for example. In some embodiments, the storage system 21 may include a memory of the gateway device 2, such as a hard disk, and/or an external storage card, such as a memory stick, a smart media card, a compact flash card, or any other type of memory card.

The gateway device 1 further includes a setting module 22, a login module 23, a Session Initiation Protocol (SIP) module 24, a detection module 25, a parameter parsing module 26, and a communication module 27. The modules 22-27 may include computerized codes in the form of one or more programs that are stored in the storage system 21. The computerized codes include instructions that are executed by the at least one processor 20 to provide functions for modules 22-27. Details of these functions will be provided below.

The setting module 22 sets a plurality of coding methods of the VoIP, and sets quality of service (QoS) parameters corresponding to each of the coding methods. In some embodiments, the coding method of the VoIP may be G729, G723, PCMU, PCMA, or G726-32, for example. The QoS parameters refer to a control mechanism to provide different priority to different applications, users, or data flows, or to guarantee a certain level of performance to a data flow. The QoS parameters guarantees are important if the network capacity is insufficient, especially for real-time streaming multimedia applications, such as Voice over Internet Protocol (VoIP), online games. The QoS parameters may include, but are not limited to an interval (referred to as "ptime") to transmit the data packets, bits of each data packet, bits of the data packets that transmitted at each interval (referred to as "vif"), a length of a header (referred to as "header_len"), bandwidth, for example. The QoS parameters may be modified, newly added, or may be canceled by the user according to actual requirements.

The setting module 22 also stores the coding methods and corresponding QoS parameters in the storage system 21.

The login module 23 logs on a VoIP account if the gateway device 2 is powered on. If no VoIP account has been registered, the login module 23 may connect to the server 4 of the wireless telephone system through the base station 3, and register the VoIP account on the server 4 automatically.

The login module 23 also provides a phone call webpage to the local user terminal 1, the phone call webpage may include, but is not limited to a contact list, a plug-in program of a VoIP component, and a dialing button. The plug-in program of a VoIP component may be downloaded to the local user terminal 1 or the remote user terminal 6 to install the VoIP component therein. The contact list shows various information of contacts, such as an address of the remote user terminal 6, VoIP phone numbers of different contacts, for example.

In response to opening the phone call webpage, the login module 23 further checks the local user terminal 1, and determines if the local user terminal 1 has installed the VoIP component. If the local user terminal has not installed the VoIP component, the login module 23 downloads the plug-in program of the VoIP component from the phone call webpage to the local user terminal 1.

The user of the local user terminal 1 may view the phone call webpage through a display of the local user terminal 1 to browse the contact list, and dials a phone call of a selected contact by clicking the dialing button. Through the phone call webpage and the VoIP components, the user may dial VoIP phone calls easily without downloading a softphone program from the telecommunication company.

As mentioned above, the user of the local user terminal 1 may dial the VoIP phone call of the remote user terminal 6 through the phone call webpage. The Session Initiation Protocol (SIP) module 24 initiates a SIP session between the local user terminal 1 and the remote user terminal 6, to determine a coding method that both of the local user terminal 1 and the remote user terminal 6 have. The determined coding method is used to transmit the VoIP packets between the local user terminal 1 and the remote user terminal 6.

For example, the local user terminal 1 supports coding methods of G729, G723, and PCMU, and the remote user terminal 6 supports coding methods of PCMU, PCMA, and G726-32. According to the SIP session, the coding method of PCMU is determined. In some embodiments, the SIP session may include following steps. A caller (e.g., the local user terminal 1) acquires an address of a callee (e.g., the remote user terminal 6), the address may be "username@domain name." A domain name system (DNS) transforms the address of the callee to be an IP address. The caller sends a request of "SIP INVITE" to the callee according to the IP address of the callee. The callee answers a response message of "SIP 200 OK". The caller sends a message of "ACK" to the callee, to complete the SIP session successfully.

In some embodiments, if the local user terminal and the remote user terminal have a same coding method, the SIP module 24 determines that the SIP session is successful, and generates the VoIP packets according to voice data of the user using the VoIP component. The VoIP packets are sent to the gateway device 2.

The detection module 25 detects the VoIP packets sent by the local user terminal 1. The VoIP packets may include Real-time Transport Protocol (RTP) data, and the RTP data may include timestamp information, for example.

The parameter parsing module 26 determines corresponding QoS parameters according to the determined coding method. As mentioned above, the QoS parameters may include an interval (referred to as "ptime") to transmit the data packets, bits of each data packet, bits of the data packets that transmitted at each interval (referred to as "vif"), a length of a header (referred to as "header_len"), bandwidth. For example, it is assumed that the determined coding method is PCMU. The "ptime" is 20 ms, which represents that one of the VoIP packets is transmitted at each 20 ms. Bits of each VoIP packet is 64 bits, and "vif"="ptime"*64=20*64=1280 bits. That is, 1280 bits may be transmitted at each 20 ms. The bandwidth may be calculated according to a following formula of:

Bandwidth=8*($vif$/8+header_len)*(1000/$p$time)=8* (1280/8+40)*50=80000 (bits/sec).

The parameter parsing module 26 parses the determined QoS parameters to generate a request packet according to a network protocol of the network between the gateway 2 and the base station 3. The network protocol may be WiMAX, WCDMA, or CDMA2000.

The communication module 27 sends the request packet to the base station 3 to request for establishing the VoIP phone call between the local user terminal 1 and the remote user terminal 6, and receives a response packet from the base station. The communication module 27 determines if the request succeeds according to the response packet. For example, the request packet includes a requested bandwidth. The communication module 27 may determine if the server 4 can allocate the requested bandwidth to the local user terminal 1 according to the response packet.

If the request succeeds, the communication module 27 inputs the RTP data into an Extended real-time Polling Service (ertPS) queue, and downloads an uplink schedule from the base station 3 to the gateway device 2. In some embodiments, the ertPS is a type of service that is defined by the IEEE 802.16 WiMAX. The ertPS is designed to work under conditions in which the data rate is in constant change. The uplink schedule lists time sequences to transmit the VoIP packets.

The communication module 27 sends the VoIP packets to the remote user terminal 6 according to the uplink schedule, to establish the VoIP phone call between the local user terminal 1 and the remote user terminal 6 successfully.

Figure 3:
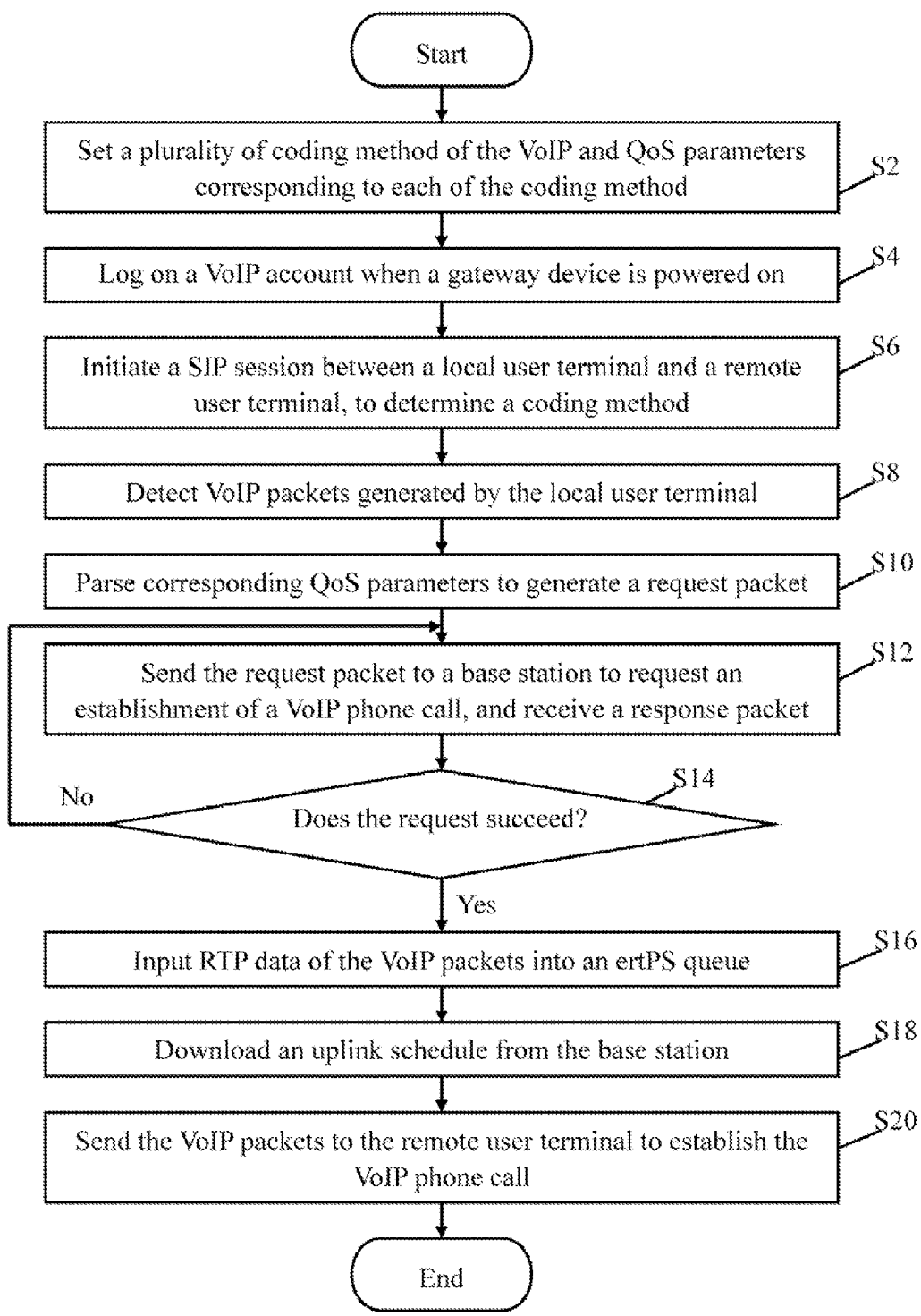
FIG. 3 is a flowchart of one embodiment of a method for establishing a VoIP communication using the gateway device of FIG. 1.

FIG. 3 is a flowchart of one embodiment of a method for establishing a VoIP communication using the gateway device 2 of FIG. 1. Depending on the embodiment, additional blocks may be added, others removed, and the ordering of the blocks may be replaced.

In block S2, the setting module 22 sets a plurality of coding methods of the VoIP, and sets QoS parameters corresponding to each of the coding methods. As mentioned above, the coding method of the VoIP may be G729, G723, PCMU, PCMA, or G726-32, for example.

In block S4, the login module 23 logs on a VoIP account if the gateway device 2 is powered on, and provides a phone call webpage to the local user terminal 1. The phone call webpage may include a contact list, a plug-in program of a VoIP component, and a dialing button.

In block S6, in response to dialing a VoIP phone call of the remote user terminal 6, the SIP module 24 initiates a SIP session between the local user terminal 1 and the remote user terminal 6, to determine a coding method that both of the local user terminal 1 and the remote user terminal 6 have. The SIP module 24 further determines that the SIP session is successful, and generates the VoIP packets according to voice data of the user using the VoIP component.

In block S8, the detection module 25 detects the VoIP packets. The VoIP packets may include RTP data, and the RTP data may include timestamp information, for example.

In block S10, the parameter parsing module 26 determines corresponding QoS parameters according to the determined coding method, and parses the determined QoS parameters to generate a request packet according to a network protocol of the network between the gateway 2 and the base station 3.

If, in block S12, the communication module 27 sends the request packet to the base station 3 to request for establishing the VoIP phone call between the local user terminal 1 and the remote user terminal 6, and receives a response packet from the base station.

In block S14, the communication module 27 determines if the request succeeds according to the response packet. If the request fails, the procedure returns to block S12.

If the request succeeds, in block S16, the communication module 27 inputs the RTP data into an ertPS queue.

In block S18, the communication module 27 downloads an uplink schedule from the base station 3 to the gateway device 2. The uplink schedule lists time sequences to transmit the VoIP packets.

In block S20, the communication module 27 sends the VoIP packets to the remote user terminal 6 according to the uplink schedule, to establish the VoIP phone call between the local user terminal 1 and the remote user terminal 6 successfully.

Although certain embodiments of the present disclosure have been specifically described, the present disclosure is not to be construed as being limited thereto. Various changes or modifications may be made to the present disclosure without departing from the scope and spirit of the present disclosure.

What is claimed is:

1. A method for establishing a Voice over Internet Protocol (VoIP) communication using a gateway device, the gateway device in communication with a local user terminal and base station of a wireless telephone system, the method comprising:
    setting a plurality of coding methods of the VoIP, and setting quality of service (QoS) parameters corresponding to each of the plurality of coding methods;
    in response to establishing a VoIP phone call with a remote user terminal by the local user terminal, initiating a Session Initiation Protocol (SIP) session between the local user terminal and the remote user terminal to determine a coding method;
    detecting VoIP packets generated by the local user terminal under the condition that the SIP session is initiated successfully, the VoIP packets comprising Real-time Transport Protocol (RTP) data;
    determining corresponding QoS parameters according to the determined coding method, and parsing the determined QoS parameters to generate a request packet according to a network protocol of the network between the gateway device and the base station;
    sending the request packet to the base station to request an establishment of the VoIP phone call; and
    establishing the VoIP phone call between the local user terminal and the remote user terminal by sending the VoIP packets from the base station to the remote user terminal under the condition that the request succeeds, comprising steps of:
    determining that the request succeeds according to a response packet sent from the base station to the local user terminal;
    inputting the RTP data of the VoIP packets into an Extended real-time Polling Service (ertPS) queue, and downloading an uplink schedule from the base station to the gateway device; and
    sending the VoIP packets to the remote user terminal according to the uplink schedule.

2. The method according to claim 1, further comprising:
    logging on a VoIP account when the gateway device is powered on; and
    providing a phone call webpage to the local user terminal, the phone call webpage comprising a contact list, a plug-in program of a VoIP component, and a dialing button.

3. The method according to claim 2, further comprising:
    in response to opening the phone call webpage, determining whether the local user terminal has been installed with the VoIP component; and
    downloading the plug-in program of the VoIP component to the local user terminal when the local user terminal has not been installed with the VoIP component, to generate the VoIP packets according to voice data of a user.

4. The method according to claim 1, wherein the SIP session is determined to be initiated successfully when the local user terminal and the remote user terminal have a same coding method.

5. A gateway device for establishing a Voice over Internet Protocol (VoIP) communication, the gateway device in communication with a local user terminal and base station of a wireless telephone system, the gateway device comprising:
    a storage system;
    at least one processor; and
    one or more programs stored in the storage system and being executable by the at least one processor, the one or more programs comprising:
    a setting module that sets a plurality of coding methods of the VoIP, and sets quality of service (QoS) parameters corresponding to each of the plurality of coding methods;
    a Session Initiation Protocol (SIP) module that initiates a SIP session between the local user terminal and the remote user terminal to determine a coding method, in response to establishing a VoIP phone call with a remote user terminal by the local user terminal;
    a detection module that detects VoIP packets generated by the local user terminal under the condition that the SIP session is initiated successfully, the VoIP packets comprising Real-time Transport Protocol (RTP) data;
    a parameter parsing module that determines corresponding QoS parameters according to the determined coding method, and parses the determined QoS parameters to generate a request packet according to a network protocol of the network between the gateway device and the base station; and
    a communication module that sends the request packet to the base station to request for an establishment of the VoIP phone call, and establishes the VoIP phone call between the local user terminal and the remote user terminal by sending the VoIP packets from the base station to the remote user terminal under the condition that the request succeeds;
    the communication module further determines that the request succeeds according to a response packet sent from the base station to the local user terminal, inputs the RTP data of the VoIP packets into an Extended real-time Polling Service (ertPS) queue, downloads an uplink schedule from the base station to the gateway device, and sends the VoIP packets to the remote user terminal according to the uplink schedule.

6. The gateway device according to claim 5, wherein the one or more programs further comprises a login module that logs on a VoIP account when the gateway device is powered on, and provides a phone call webpage to the local user terminal, the phone call webpage comprising a contact list, a plug-in program of a VoIP component, and a dialing button.

7. The gateway device according to claim 6, wherein the login module further determines whether the local user terminal has been installed with the VoIP component in response to opening the phone call webpage, and download downloads the plug-in program of the VoIP component to the local user terminal when the local user terminal has not been installed with the VoIP component, to generate the VoIP packets according to voice data of a user.

8. The gateway device according to claim 5, wherein the SIP module further determines that the SIP session is initiated successfully when the local user terminal and the remote user terminal have a same coding method.

9. A non-transitory storage medium storing a set of instructions, the set of instructions capable of being executed by a processor to perform a method for establishing a Voice over Internet Protocol (VoIP) communication using a gateway device, the gateway device in communication with a local user terminal and base station of a wireless telephone system, the method comprising
    setting a plurality of coding methods of the VoIP, and setting quality of service (QoS) parameters corresponding to each of the plurality of coding methods;
    in response to establishing a VoIP phone call with a remote user terminal by the local user terminal, initiating a Session Initiation Protocol (SIP) session between the local user terminal and the remote user terminal to determine a coding method;
    detecting VoIP packets generated by the local user terminal under the condition that the SIP session is initiated successfully, the VoIP packets comprising Real-time Transport Protocol (RTP) data;
    determining corresponding QoS parameters according to the determined coding method, and parsing the determined QoS parameters to generate a request packet according to a network protocol of the network between the gateway device and the base station;
    sending the request packet to the base station to request for an establishment of the VoIP phone call; and
    establishing the VoIP phone call between the local user terminal and the remote user terminal by sending the VoIP packets from the base station to the remote user terminal under the condition that the request succeeds, comprising steps of:
    determining that the request succeeds according to a response packet sent from the base station to the local user terminal;
    inputting the RTP data of the VoIP packets into an Extended real-time Polling Service (ertPS) queue, and downloading an uplink schedule from the base station to the gateway device; and
    sending the VoIP packets to the remote user terminal according to the uplink schedule.

10. The non-transitory storage medium as claimed in claim 9, wherein the method further comprises:
    logging on a VoIP account when the gateway device is powered on; and
    providing a phone call webpage to the local user terminal, the phone call webpage comprising a contact list, a plug-in program of a VoIP component, and a dialing button.

11. The non-transitory storage medium as claimed in claim 10, wherein the method further comprises:
    in response to opening the phone call webpage, determining whether the local user terminal has been installed with the VoIP component; and
    downloading the plug-in program of the VoIP component to the local user terminal when the local user terminal has not been installed with the VoIP component, to generate the VoIP packets according to voice data of a user.

12. The non-transitory storage medium as claimed in claim 9, wherein the SIP session is determined to be initiated successfully when the local user terminal and the remote user terminal have a same coding method.

\* \* \* \* \*